United States Patent [19]

Preschutti

[11] Patent Number: 4,947,386

[45] Date of Patent: * Aug. 7, 1990

[54] FIXED GAIN FIXED LOSS AMPLIFICATION SYSTEM

[75] Inventor: Joseph P. Preschutti, State College, Pa.

[73] Assignees: AMP Incorporated; Broadband Networks, Inc., both of Harrisburg, Pa.

[*] Notice: The portion of the term of this patent subsequent to May 30, 2006 has been disclaimed.

[21] Appl. No.: 360,580

[22] Filed: Jun. 2, 1989

Related U.S. Application Data

[62] Division of Ser. No. 116,481, Nov. 2, 1987.

[51] Int. Cl.⁵ .................. H03H 11/06; H04L 5/14

[52] U.S. Cl. .................................... 370/26; 333/16; 379/398

[58] Field of Search .............. 333/16, 18, 17 R; 379/398; 330/52; 375/13, 36, 11, 12; 370/26

[56] References Cited

U.S. PATENT DOCUMENTS 4,201,959  5/1980  Niiro et al. .................. 333/16
4,208,640  6/1980  van der Meijs .............. 333/18

Primary Examiner—Douglas W. Olms
Assistant Examiner—Alpus H. Hsu

[57] ABSTRACT

An easy to install and easy to expand broadband local area network is disclosed. The network has a star-type architecture based upon a fixed-gain, fixed-loss approach to amplification and a star-feeder approach to providing user connection to the network.

7 Claims, 9 Drawing Sheets

FIXED GAIN FIXED LOSS AMPLIFICATION SYSTEM

This application is a Divisional of Application Ser. No. 07/116,481 filed Nov. 2, 1987.

RELATED PATENT

U.S. Pat. No. 4,835,494 issued May 30, 1989 contains subject matter related to the subject matter disclosed and claimed herein and is assigned to the assignee hereof.

FIELD OF THE INVENTION

The present invention relates to a local area network (LAN) and, more particularly, to a broadband local area network using coaxial cable which is easy to design, easy to install, and easy to expand.

BACKGROUND OF THE INVENTION

The term broadband refers generically to any wideband transmission medium. Broadband coaxial communications systems, as the name implies, transport multiple information signals using coaxial cable. In use for video for over thirty years, broadband coax has only recently found widespread use for the carriage of voice and data communications. The large bandwidth available allows large numbers of services to be carried on a single cable.

An understanding of broadband is most easily obtained by contrasting it with baseband communications. In a baseband system, the information signal (i.e. voice, data or video) may be connected directly to the cable. In this manner the service has access to the full transmission channel, but only one service may utilize the cable at any given time. Broadband utilizes a technique similar to that employed by all radio and television broadcasters, i.e. RF (radio-frequency) modulation. The baseband information is first modulated onto an RF carrier before being applied to the cable. By using many different carriers, multiple signals can be handled on the same transmission path.

The transportation medium in a broadband system is coaxial cable. A typical broadband coax system supports carrier frequencies from 5 MHz to 450 MHz. Many services may use the same cable simultaneously by operating each on a different carrier.

As with any transmission medium, the RF signals travelling along the cable are attenuated, or lose their power. Unless the system is relatively short, RF amplifiers are necessary to boost the signals back to their original levels. Broadband amplifiers used in LANs will oftentimes be referred to as bidirectional amplifiers. To provide two-way communications on a broadband network, the available bandwidth of the cable is split in two. The two resulting bandwidths are referred to as the outbound and inbound bandwidths. These two bandwidths carry the information signals in opposite directions. A typical midsplit broadband amplifier, for instance, passes 1-120 MHz in one direction (inbound) and 150-450 MHz in the other (outbound). This provides full-duplex communications on a single cable.

Broadband communications technology similar to that developed for the Cable Television (CATV) industry is often used in local area networks.

Conventional broadband coaxial cable local area networks are generally arranged in what is known as a "tree-and-branch" configuration utilizing equipment and technologies developed for CATV systems. Such a network has a headend, which illustratively has a central computer facility. A signal to be distributed to locations throughout the facility leaves the central computer facility on a "trunk" cable. The "trunk" cable characteristically has no user devices connected, and is intended to transport the signals carried on the system to a general area where "users" are to be located. Most systems require "trunk amplifiers to amplify the RF signals carried on the "trunk⇌ cable at various locations. In addition, the trunk cable can be split over two or more paths, "branching" out to several general areas where users are located User devices are connected to the system via a "tapped feeder" cable. This tapped feeder portion of the network emanates from "bridging" amplifiers that isolate the "trunk" from the "tapped feeder" portion of the system. In some cases "terminating trunk" or "terminating bridger" amplifiers are used to delineate the point at which a "tapped feeder" portion of the system begins and the "trunk" portion of the system ends. Tapped feeder cables are generally arranged as a serial connection of several relatively short (compared to the length of trunk cable) lengths of coaxial cable and tap units. In addition, the tapped feeder cable can be split into two or more cables, providing several portions of serially connected taps and cables. Each user device such as a computer terminal is connected to a tap by means of a drop cable of limited length.

Problems with such conventional CATV equipment and architecture in broadband local area networks include a high degree of complexity in network design and component specification, inflexibility for growth and rearrangement which causes network costs to be artificially high, relatively reduced reliability and fault correction time due to the relatively high number of serially connected devices, and relatively higher installation and maintenance costs associated with the nature and complexity of conventional CATV hardware used to implement these networks. Each of these problems will be discussed briefly below.

The high degree of complexity in network design and component selection is due to two factors. First, the tapped feeder portion of the network requires that path loss calculations be performed for each tap unit in both the inbound and outbound directions at two or more frequencies. This path loss calculation is typically done by specialists acting as consultants who in turn utilize specialized computer programs developed and marketed specifically for performing broadband LAN system designs Secondly, the bi-directional amplifiers used in LANs based upon CATV technology require specification of several accessories necessary to perform independent "balancing" of the gain versus frequency characteristics for both outbound and inbound amplifiers. This requires that proper plug-in attenuators and plug-in cable equalizers be specified as well as the knowledge of the limitations of continuously variable attenuators and equalizers which are provided with each bidirectional amplifier. In addition, path loss calculations must be performed for at least two frequencies in each of the inbound and outbound signal paths for the trunk portion of the system.

The inflexibility of conventional broadband LANs to accommodate growth and rearrangement is primarily due to the nature of the tapped feeder portions of the system. Each tapped feeder portion of the system comprises several serially connected short lengths of coaxial cable and tap units. The decibel value of attenuation of the tap units is selected to properly balance the path loss in both inbound and outbound directions at that particular location. This path loss is dependent upon devices connected between the tap unit and the headed. If, for instance, a change in the system was required to add an additional tap unit at a location that has other tap units located downstream in the outbound direction, it would be not only necessary to perform calculations for selection of the tap to be added to accommodate the additional outlets, but recalculation of path loss for each and every tap unit located beyond the expansion point would also be required. If the calculations resulted in performance specifications which did not meet system requirements, then these tap units might have to be respecified and reinstalled. A conventional solution to this problem is to initially build the network with excess capacity. Thus, extra taps are provided corresponding to extra user positions. This is generally wasteful since the network must be built to a capacity, the need for which is unknown. Typical tap outlet utilization in conventional broadband LANs is in the neighborhood of 10 to 15%. This over-installation results in higher system installation costs.

The relatively reduced reliability and higher fault correction time of conventional broadband LANs is due to the architecture of the system that employs a multiple of serially connected devices Failure of a component can cause system failure for all devices connected to the system beyond the point of failure. Minimizing the number of serially connected devices will reduce system fault correction time and improve reliability.

Higher installation and maintenance costs are associated with utilizing CATV hardware and architecture in conventional broadband LANs. The CATV hardware is typically packaged in a manner which allows use in either one-way or two-way systems. CATV hardware universally employs separate modules for outbound and inbound amplifiers with separate adjustment of both outbound and inbound amplifiers requiring selection of up to four adjustable components in each outbound and inbound amplifier, these adjustments being selection of a plug-in pad, variable attenuator, plug-in cable equalizer, and variable cable equalizer. Installation of this complex amplification hardware requires trained technicians with extensive experience in CATV technology. In addition, higher maintenance costs are associated with both the complexity of the hardware and the higher fault correction time mentioned previously.

Recent performance standards for broadband LAN systems including IEEE 802.7 Broadband Local Area Network Recommended Practices and General Motors Manufacturing Automation Protocol (MAP) Broadband Media Specifications have been published. These performance standards specify important network performance criteria which might be implemented by a broadband LAN.

Accordingly, it is the object of the invention to provide a LAN which is easier to design, install, maintain, rearrange and expand than prior art LANs as well as being of lower cost than prior art LANs. It is also an object of the invention to provide a LAN which meets or exceeds performance standards required by IEEE 802.7, MAP and other specifications.

SUMMARY OF THE INVENTION

The present invention is a local area network which is simple to design, install, maintain, rearrange and expand. The simplicity is achieved by a combination of elements, which taken together, provide a "tinker-toy" or "building block" arrangement which, as a package, can be configured to form a LAN which meets certain required system specifications, such as IEEE 802.7 and MAP. The LAN makes use of an inventive means of providing for RF signal amplification and RF signal balancing identified herein as the "fixed-gain, fixed-loss" technique, which can be used to simplify design, installation and maintenance of the inventive system's counterpart to the conventional prior art trunk portion of the LAN system. The inventive system also includes an inventive method of providing user outlet connections, identified herein as the "star-feeder" technique, which can meet required standards of system performance and simplify design, installation and maintenance of the inventive system's counterpart to the conventional prior art "tapped-feeder" portion of the system. The inventive LAN also includes an inventive arrangement for interfacing the "fixed-gain, fixed-loss" technique of broadband RF amplification with the inventive "star-feeder" technique.

The inventive LAN has a generally star-like architecture, i.e. the network comprises a central hub and a plurality of nodes connected to the central hub by means of coaxial cable, and a plurality of remote outlet clusters connected to the nodes by means of coaxial cable. The LAN permits bidirectional communication among and between network user devices and bidirectional communication between network user devices and external devices.

The hub is an integrated package which provides input connections, amplification and output connections for use in the broadband LAN without the need for alignment or adjustment of components. The hub comprises an array of input connection ports which enables the LAN to be connected to and communicate with external devices normally associated with the headed of a broadband LAN including pilot generators, translators, remodulators and other equipment required by devices and networks utilizing the broadband LAN. The hub also includes a hub driver module that comprises a "fixed-gain" bidirectional RF amplifier, and an output array comprising a plurality of output ports.

The node is an integrated package which provides an input connection, "fixed-gain" amplification and output connections for use in the broadband LAN with the need for adjustment of only one component. The nodes are connected to the output ports of the hub by means of coaxial cable. Each node may also be connected to up to two other nodes. In addition, each node may be directly connected to a plurality of network user devices through a direct drop panel. In addition, each node may be connected to a plurality of remotely located outlet clusters through an output array Each remote outlet cluster may be a 2-port, 4-port, 6-port, or 8-port device depending upon how far from the associated node it is located. The remote outlet clusters are in turn connected to network user devices. Each node also has a line balancer which is used to provide the "fixed loss" required between fixed gain amplifiers, thus adjusting losses between hub-to-node and node-to-node connections.

Each remote outlet cluster comprises either a 2-port, 4-port, 6-port, or 8-port RF splitter and an equalizer circuit. The equalizer circuit is included to provide proper path loss for the LAN.

The inventive network is easy to design. In particular, no design is required at the hub due to the integrated nature of the package and the utilization of the "fixed-gain, fixed-loss" technique. A very simple design rule applies to hub-to-node and node-to-node connections due to the "fixed-gain, fixed-loss" technique. No design calculations are required for direct user connection to the nodes. No design calculations are required for connection of remote outlet clusters to nodes or direct user connections to remote outlet clusters.

The inventive network is easy to install because the nodes may be located at a variable distance from the hub or from other nodes. Installation of the nodes requires knowledge of only the distance between these devices and selection of one device (i.e. the line balancer) to compensate for the variable loss between hub-to-node or node-to-node and adjustment of only one component to compensate for this variation in loss. For example, in a node-to-node connection, there is a net gain of unity between the input of the fixed gain amplifier of the first node and the input of the fixed gain amplifier of the second node. Thus, the losses provided by the network components such as the interconnecting coax cable, when added to the (adjustable) loss provided by the line balancer, offset the gain provided by the fixed gain amplifier. Hence the name "fixed gain, fixed loss" amplification.

Further, the inventive network is easy to install because only that equipment required to connect known users to the system must be installed. Further, the inventive network is easy to install because the length of the "drop cable" can be longer, allowing for greater coverage of area by the nodes and the outputs of the remote outlet clusters when compared to conventional technology.

The inventive network is easy to expand without concern for unbalancing the network. In particular, the network is easily expandable by simply connecting additional nodes to the hub or to other nodes, and/or by adding additional remote outlet clusters to various nodes so that additional user devices can be added to the network. For example, a network may start small by comprising a hub, one or two nodes connected to the hub, and one or two direct user connections to the node. The network can be expanded by connecting remote outlet clusters to each node, by connecting more nodes to the hub (which illustratively has a capacity for eight nodes) and by connecting additional nodes to other nodes.

DETAILED DESCRIPTION OF THE INVENTION

1. Prior Art Local Area Network

Figure 1:
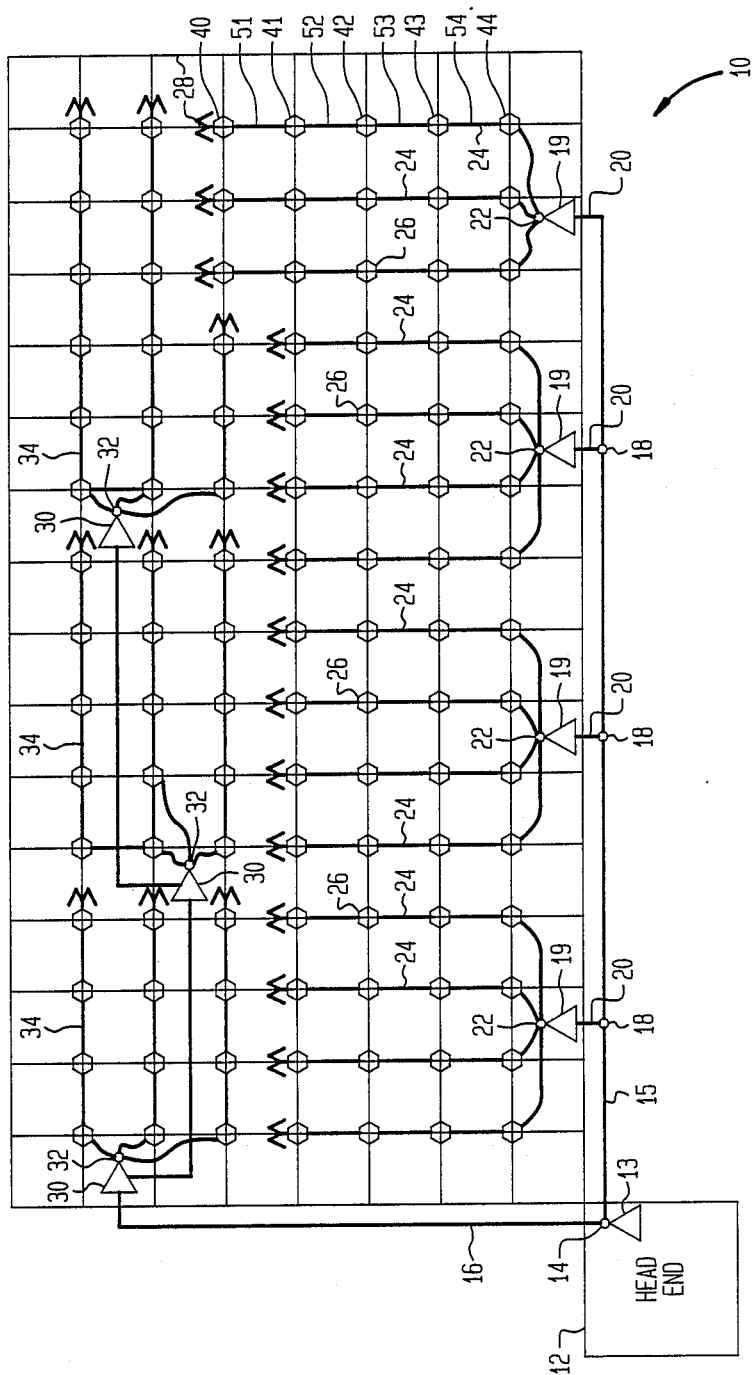
FIG. 1 schematically illustrates a conventional prior art local area network.

Before discussing the local area network of the present invention in detail, it may be helpful to briefly review a conventional prior art LAN. Such a prior art network is illustrated in FIG. 1. The network 10 of FIG. 1 has a conventional "tree-and-branch" architecture and is laid out on a 640 ft. ×320 ft. grid which for example corresponds to a 204,800 square foot plant. The grid spacing in FIG. 1 is 40 ft. The network 10 comprises a head end 12, a bidirectional amplifier 13 and a splitter 14 connected to the amplifier 13. Two cable branches 15 and 16 emanate from the splitter 14. These branches are in turn divided into other branches. Thus, the branch 15 is divided into four branches 20 by means of the splitters 18. Each branch 20 includes a bidirectional amplifier 19. Each bidirectional amplifier 20 is a "terminating trunk" or "terminating bridger" type amplifier. Each bidirectional amplifier 20 is connected to a splitter 22. At each splitter 22, the "trunk" portion of the system ends and a "tapped feeder" portion of the system begins. Thus, each splitter 22 provides for a tapped feeder portion comprising a plurality of branches 24. Each branch 24 comprises a plurality of serially connected taps 26 and is terminated by a terminator 28 Each tap may be connected to a user device such as a computer terminal, video terminal, or a piece of automated manufacturing equipment with suitable RF modem capability. This connection is typically through a "drop cable" (not shown) comprising flexible RG-6 type cable with a limited length, typically 50 feet or less. Similarly, the branch 16 of the network 10 is divided into a plurality of other branches. Thus the branch 16 includes the serially connected amplifiers 30, each of which has an associated splitter 32. Each splitter 32 provides three branches 34. Each branch 34 comprises a plurality of serially connected taps and is terminated by a terminator. The network 10 of FIG. 1 services 84 users.

As indicated above, a local area network such as the network 10 is complex to design, difficult to expand once installed and difficult to expand once installed. Both the trunk section and the tapped feeder section in conventional local area networks are difficult to design and install.

Figure 2:
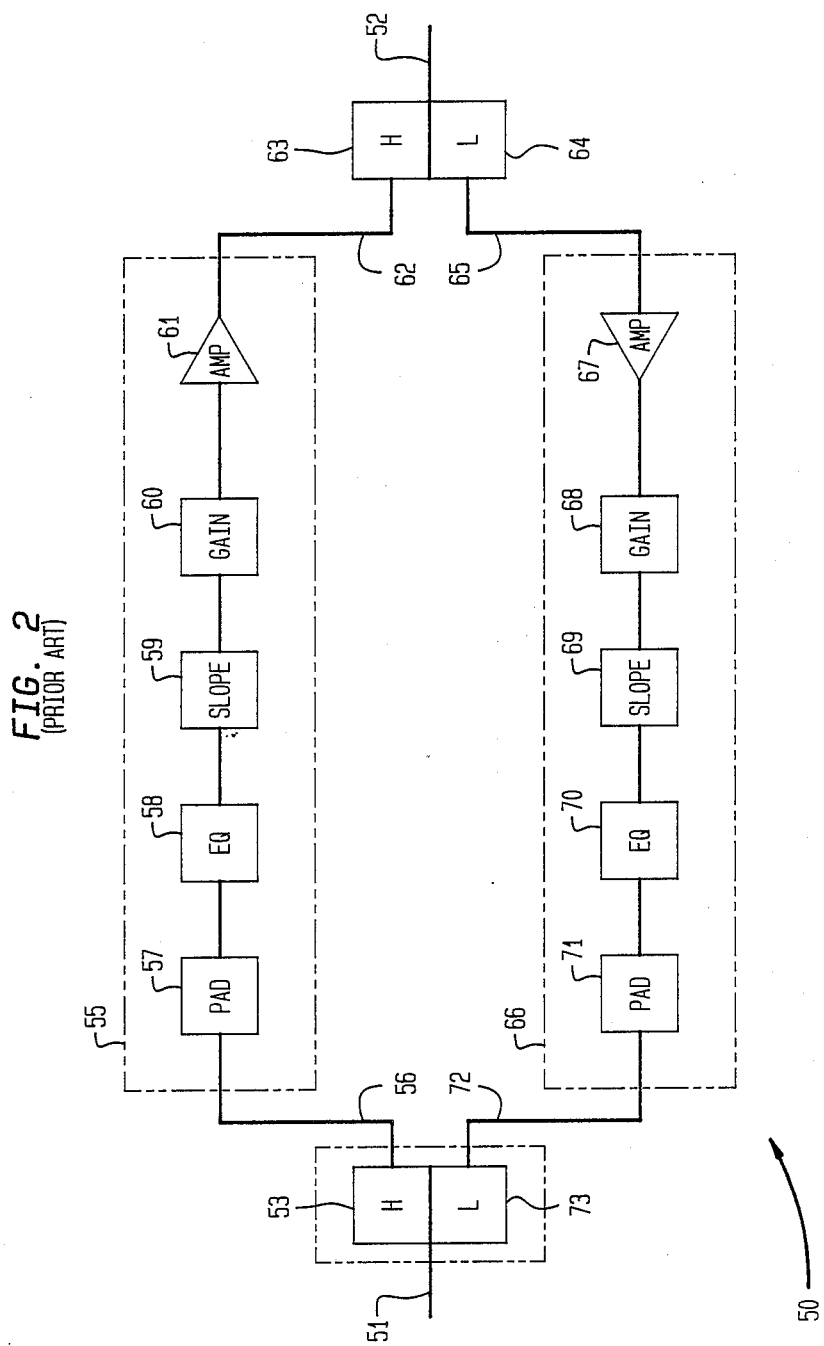
FIG. 2 schematically illustrates a conventional prior art bidirectional amplifier used to implement broadband LANs.

The difficulty to design and install the trunk section of a conventional LAN is directly related to the complexity of the bidirectional amplifiers used therein. Bidirectional amplifiers are located in the system where required by physical as well as electrical constraints of the system. Thus, the decibel attenuation of the path between the headed and a bidirectional amplifier and/or the decibel attenuation between two serially connected amplifiers will vary depending upon combined value of the decibel attenuation of coaxial cable and splitters in the signal path between amplifiers. Prior art broadband amplifiers are designed using a technique for independently adjusting the gain versus frequency characteristic of the amplifier for the outbound signal path and inbound signal path, which essentially emulates two independent variable gain amplifiers. In addition, the adjustment of the gain versus frequency characteristic of the amplifier requires a minimum of three and frequently four different variable elements for both inbound and outbound signal paths, resulting in a minimum of six and typically eight different variable elements being employed FIG. 2 illustrates a prior art bidirectional amplifier. The amplifier 50 comprises an input port 51 and an output port 52. RF signals being transmitted in the outbound direction enter the bidirectional amplifier at port 51. Highpass filter 53 passes outbound high frequency signals to the outbound amplifier 55 and fixed plug-in pad 71, which perform functions similar to the elements 57, 58, 59, 60, 61. Inbound RF signals then are connected through connection 72 to the low pass filter 73 which, in turn, directs signals to port 51, from where the inbound low frequency signals then proceed back towards the headed.

The order of serial connection of elements 57, 58, 59, 60, 61 in the outbound amplifier 55 and the serial connection of the elements 67, 68, 69, 70, 71 in the inbound amplifier 66 may change, but the basic functionality remains the same in most conventional bidirectional amplifiers.

Designing a prior art network trunk system involves calculation of path loss between headed and bidirectional amplifiers and also calculation of path loss between serially connected bidirectional amplifiers Such path loss calculations must be done at a minimum of four frequencies:
 (1) lowest frequency of the inbound path,
 (2) highest frequency of the inbound path,
 (3) lowest frequency of the outbound path, and
 (4) highest frequency of the outbound path.

Once these calculations have been performed, eight different amplifier variable elements must be specified:
 (1) Outbound Plug-in Pad (element 57 of FIG. 2)
 (2) Outbound Plug-in Equalizer (element 58 of FIG. 2)
 (3) Outbound Variable Gain Adjustment (element 60 of FIG. 2)
 (4) Outbound Variable Slope Adjustment (element 59 of FIG. 2)
 (5) Inbound Plug-in Pad (element 71 of FIG. 62)
 (6) Inbound Plug-in Equalizer (element 70 of FIG. 62)
 (7) Inbound Variable Gain Adjustment (element 68 of FIG. 2)
 (8) Inbound Variable Slope Adjustment (element 69 of FIG. 2)

Installing a prior art network trunk system involves installation and adjustment of the complex equipment described above.

The difficulty to design and install the tapped feeder sections of a conventional LAN is directly a result of the nature of the architecture being used and the equipment being employed to provide specified system performance characteristics at the user connections. Broadband LAN specifications include a required RF signal level at the user connections for both the outbound signal being delivered to the user as well as the ability to accept a specified RF signal level transmitted by the user.

The tapped feeder sections of conventional prior art networks require complex design calculations and a large selection of tap devices Each tap unit in the system must be carefully selected to provide the proper path loss for the outlets of the tap unit relative to the design of the rest of the system. Commonly used tap units for broadband LANs include a variety of eighteen different eight-port tap units having decibel attenuation values for the tap outlets from 11.0 dB to 36.5 dB in 1.5 dB steps. In this manner, a tap unit located close to a bidirectional amplifier might require a higher value tap unit, for example a 36.5 dB tap, while a tap unit which was at an extremity of a branch might have a low value tap unit, for example an 11.0 dB tap unit, while those locations between these extremes might have intermediate value tap units.

The value of the tap unit selected for a particular location depends upon calculation of the attentuation of all previous devices in the system between the particular tap unit being selected and the bidirectional amplifier driving that particular feeder line. Proper design of the tapped feeder requires that path loss calculations be performed for at least four frequencies for each tap in the system:
 (1) lowest frequency of the inbound path,
 (2) highest frequency of the inbound path,
 (3) lowest frequency of the outbound path, and
 (4) highest frequency of the outbound path Furthermore, the path loss calculation requires that the attenuation of all devices located between a tap and the bidirectional amplifier feeding that tap be considered. For example, in FIG. 1 the path loss calculation for tap 40 requires that the losses of not only tap 40 but also taps 41, 42, 43, 44, cable sections 51, 52, 53, 54 and 55 and splitter 22 be calculated at each of the four frequencies of interest. Thus it is easy to see that calculations involving a single tap unit require considerable effort.

Furthermore, the system design process usually involves a trial and error process to optimize the location of amplifiers and cable routing to minimize the amount of materials required to implement the system. Thus, a well designed conventional broadband LAN implementation of the system shown in FIG. 1 might easily require thousands of calculations. Consequently, prior art systems are generally designed by specialists in the art, utilizing computer programs and specialized software Conventional prior art tapped feeder system design concepts also impose limitations in the length of the coaxial cable "drop connection" used to connect user devices to the system. System performance requirements relative to the allowable path loss of the system in both inbound and outbound directions generally specify that path loss include the attenuation of the "drop connection" coaxial cable. Both IEEE 802.7 and MAP specifications require design of path loss to be a certain value with an allowed variation of plus or minus 3 dB. Common practice for practical and cost effective system design in conventional systems involves limiting the "drop connection" coaxial cable (generally RG-6 type coax having a loss of approximately 4 dB per 100 feet at 450 MHz) to either a fixed length, or a maximum length, for example 50 feet. Specifying a fixed length of drop cable allows the system designer the full plus or minus 3 dB to be used in selecting the proper tap attenuation. Specifying an allowed variable length of drop cable up to a maximum length requires a tighter performance at the tap outlet which, in turn, requires more attention to details of the tapped feeder. When the drop cable is limited to 50 feet, more tap units must be installed in order to provide the ability to deliver service to a certain area within the system. For example, if the drop cable could somehow have the ability to increase to 100', less tap units could be installed. However, if 100' variable length drop cables were specified with conventional networks, the resultant requirement of the tapped feeder design would require path loss variations to be limited to plus or minus one dB. This is generally considered to be impractical with conventional approaches and the tree-and-branch architecture.

The installation of conventional tapped feeder sections is both complex and difficult because compliance tests must be performed to ensure system performance to specification. These tests require that the designer provide documentation of the expected path loss at each of the specified frequencies at each of the tap units, and certification that the network is providing the specified performance at each of these tap units. Furthermore, the installation of the conventional tapped feeder section is complex and difficult because it requires that eighteen different types of tap units be specified, inventoried, and installed.

Expansion and growth of the prior art network is both complex and difficult because, for example, if additional outlets are required in the vicinity of the cable between taps 44 and 43 in FIG. 1, a new tap would have to be spliced into the tapped feeder. The insertion loss of the new tap unit would increase both the inbound and outbound path loss for taps 40, 41, 42, and 43. This increase in attenuation would then require that the path loss calculations for each of the above named affected taps which are located downstream from the added tap be redone. In addition, if the system performance parameters could not be achieved, a different tap value would have to be installed for the locations which were no longer in compliance 2. Overview of the Inventive Local Area Network Turning to FIG. 3, the local area network of the present invention is schematically illustrated. The local area network 100 of FIG. 3 permits bidirectional communication among a plurality of network user devices such as personal computers, video devices, automated manufacturing devices and other devices. The LAN 100 also enables bidirectional communication between the LAN user devices and external devices, networks, and data bases.

Figure 3:
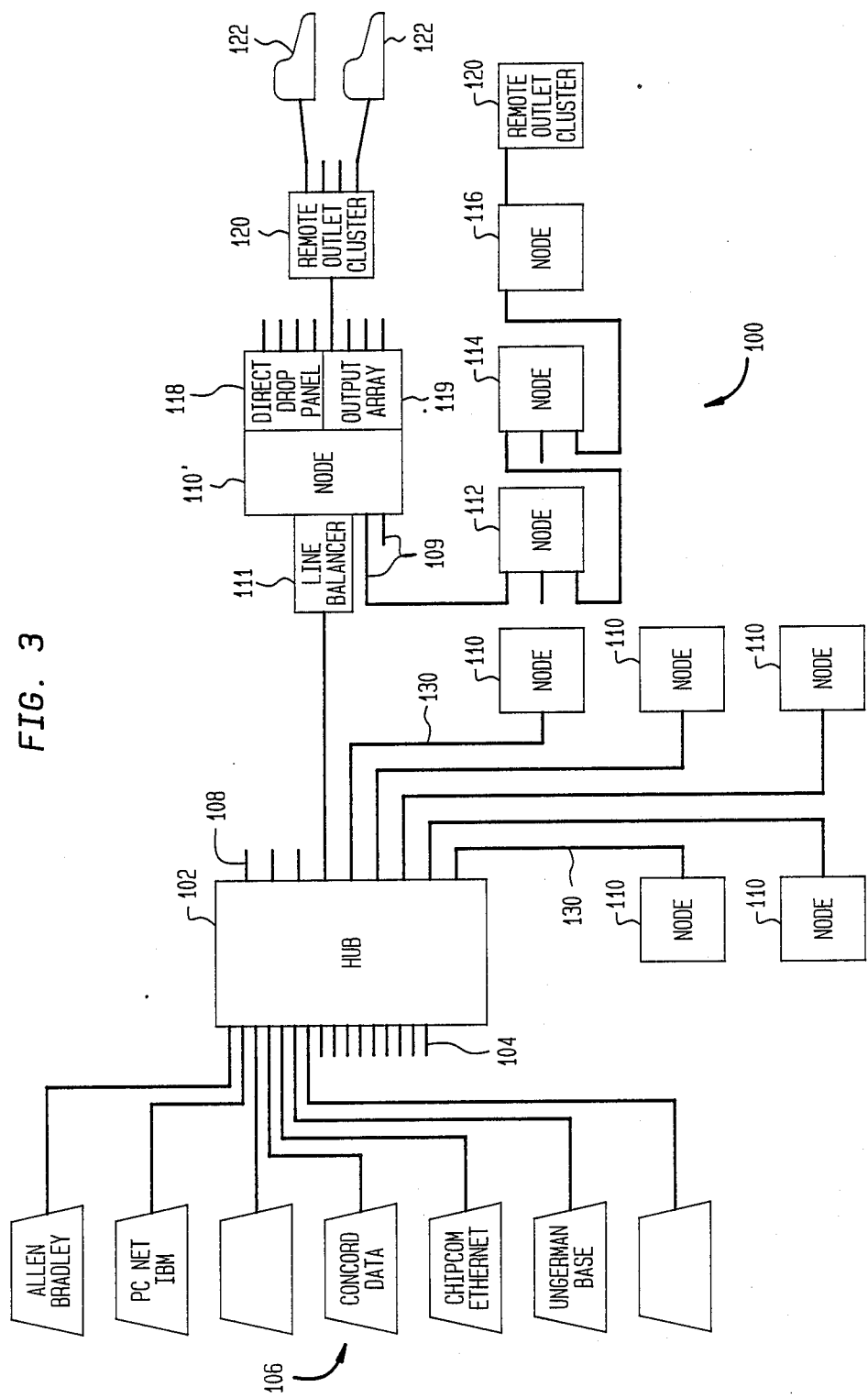
FIG. 3 schematically illustrates a LAN in accordance with an illustrative embodiment of the present invention.

The network 100 of FIG. 3 comprises a central hub 102. Illustratively, the hub includes a plurality of inputs 104 which are designed for applicable standards as a network interface for connecting devices to the network. Examples of such standards are the IEEE 802.7 and the General Motors MAP specification Devices 106 which may be connected to the network include for example translators and remodulators for systems supplied by Allen-Bradley, Ungerman-Bass and Concord Data as well as other networks such as the Chipcom Ethernet Network and the IBM PC Net. The hub also includes a plurality of output ports 108. The output ports operate at RF signal power levels required to implement the fixed-gain, fixed-loss approach to broadband system design incorporated in the inventive network.

At least some of the output ports 108 are connected to the nodes 110. Illustratively, the hub 102 and each node 110 may be separated by up to 20 decibels of cable loss at 450 MHz. A node 110 may include a line balancer 111 which provides the proper amount of attenuation to achieve the fixed-gain, fixed-loss approach to broadband system design incorporated in the inventive network. Through use of the line balancer, system design is simplified to the point of making a single calculation. The decibel loss of the coaxial cable at the highest outbound frequency, illustratively 450 MHz, and then specifying the proper line balancer for that particular location. This compares to four calculations and selection or adjustment of up to eight components in the conventional local area network.

A node 110 may include two node expansion ports 109 to drive two other nodes. Thus, for example, the node designated 110' in FIG. 3 is connected to the node 112. The node 112 is connected to the node 114, which in turn is connected to the node 116. All node-to-node connections are provided by the node expansion ports. Illustratively, the node-to-node separation may be 10 decibels of cable loss at 450 MHz.

In addition, a node may have two output slots, each of which can have inserted one of two different types of output devices, either a drop panel 118 or an output array 119. A node may drive a plurality of direct connections to user devices through use of the drop panel 118 which may have a plurality of outputs designed for applicable standards as a network interface for connecting devices to the network, for instance IEEE 802.7 or General Motors MAP specification. Illustratively, each direct drop connection from a node to a user connection device may be up to 120 feet of RG-6 type coaxial cable. This compares to typical allowable drop lengths of 50 feet of RG-6 coaxial cable for prior art networks.

A node may drive a plurality of remote outlet clusters 120. The remote outlet clusters are connected to the output array 119. The remote outlet clusters may drive a plurality of direct connections to user devices 122 with said applicable standards applying. Illustratively, each direct drop connection from a remote outlet cluster 120 to a user connection device 122 may be up to 75 feet of RG-6 type coaxial cable. This compares to typical allowable drop lengths of 50 feet of RG-6 coaxial cable for prior art networks. Depending upon the distance between the node and the particular remote outlet cluster 120, the remote outlet cluster 120 may be a 2, 4, 6 or 8 port device. Illustratively, the remote outlet cluster and the node are connected by RG-11 cable. If the separation between the node and the user outlet splitter is up to 75 feet of RG-11 cable, the 8-port device is used. If the separation is between 75 and 140 feet, the 6-port device is used. If the separation is between 140 and 210 feet, the 4-port device is used. If the separation is between 210 and 300 feet, the 2-port device is used.

Figure 4:
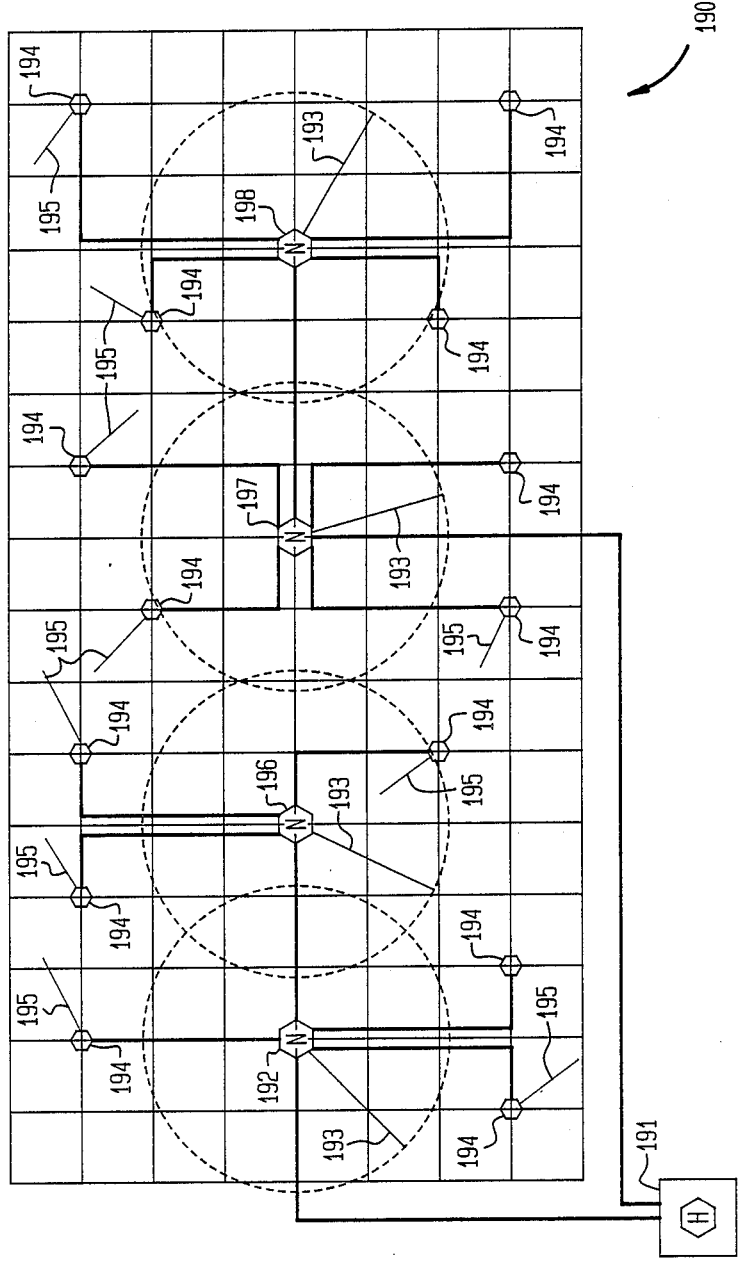
FIG. 4 schematically illustrates a LAN in accordance with an illustrative embodiment of the present invention in the same facility as the network of FIG. 1.

FIG. 4 illustrates a local area network 190 constructed in accordance with the principles of the present invention. The network 190 of FIG. 4 is installed in the same physical plant as the network 10 of FIG. 1. The network 190 of FIG. 1 is designed for the same number of users (i.e. 84) as the network 10 of FIG. 1. In FIG. 4 the inventive network 190 comprises a hub 191 connected via coaxial cables to two nodes, 192 and 197, which are in turn connected to the two other nodes, 196 and 198. Nodes 192, 196, 197, and 198 have several direct drop connections 193, each of which illustratively can be up to 120 feet in length of RG-6 type coaxial cable. A circle having a radius of 120 feet is drawn in phantom around each of the nodes in FIG. 4 to indicate where direct drop connections may be located. In addition, several remote outlet clusters 194 are connected to each of the nodes. Several direct drops 195 are shown connected to the remote outlet clusters 194. Compared to the network in FIG. 1, the inventive network in FIG. 4 is especially less complex.

The network of FIG. 4 is especially easy to design. The design calculations involving selecting the proper line balancer to be installed in each node is one per node. The number of devices to be specified in order to accomplish design is one per node. This compares to calculating path loss at four different frequencies and specifying several different plug-in accessories for each bidirectional amplifier in FIG. 1. In the network of FIG 4 there are no calculations required for "design" of the inventive network's equivalent to the prior art "tapped feeder" section of the system. This compares to literally thousands of calculations required in the prior art network of FIG. 1. Thus, the inventive network eliminates the necessity of requiring design specialists and computer programs as well as excessive documentation for path loss calculations. As is discussed below, in the network of FIG. 4 there are only four different types of remote outlet clusters to select from, compared to eighteen in the network of FIG. 1.

The network of FIG. 4 is especially easy to install. The number of components and amount of coaxial cable required is dramatically reduced. In addition, as is discussed below, the balancing of the RF signals in the RF amplifiers is reduced to a single component selection with a single component adjustment. Also, the compliance testing is reduced due to the fewer number of devices requiring proof of conformance to acceptance specifications.

The network of FIG. 4 is especially easy to expand and rearrange in that additional remote outlet clusters and/or additional nodes may be added without concern for effect on any previously installed equipment.

The network of FIG. 4 is especially easy to maintain in that the number of electronic devices necessary to implement the system is dramatically reduced. The network of FIG. 4 is especially easy to maintain in that the number of serially connected electronic devices is dramatically reduced compared to the network in FIG. 1. The maximum number of serially connected devices in FIG. 4 is four, comprising the hub 191, node 192, node 196 and the remote outlet cluster 94. The maximum number of serially connected devices in FIG. 1 is twelve. Thus fault detection time is reduced in the inventive network.

The network of FIG. 4 is especially easy to use because the "drop connection" cables can be a variable length and are generally allowed to be significantly longer than the "drop connections" of the conventional network of FIG. 1, when attempting to implement typical performance standards such as MAP or IEEE 802.7.

3. Fixed-Gain, Fixed-Loss Amplification

Broadband systems used in both CATV and LANs utilize bidirectional amplifiers which are based upon a system concept which solves the problem of variable loss between amplification locations by providing a variable gain amplifier. The means by which the variable gain amplifier is realized is by inclusion of several plug-in and hard-wired circuits which accomplish the task of tailoring the gain versus frequency characteristic of the amplifier to counterbalance the variable loss versus frequency characteristic of the transmission path between amplifiers. This variable gain amplifier concept lends itself well to the CATV environment, where the system size usually is sufficient to allow for a staff of well trained technicians to maintain the system, and wherein there is little or no need for two-way communications equipment, since most CATV systems operate broadband in a transmit mode only. However, when this technology and system concept is applied to local area networks, which are usually significantly smaller in size, and which are universally operating in a two-way mode with significant bandwidth used for outbound as well as inbound signal transmission, the prior CATV art causes problems.

One problem is that the prior art amplifiers are complex, requiring selection of up to eight circuit elements as previously described in connection with FIG. 2. This complexity generally prohibits the system operator, who might be familiar with data systems, but lacking in broadband expertise, from becoming familiar enough with the technology to allow in-house staff the ability to install, maintain and modify the system. Another problem is that the fault correction time is longer on a conventional amplifier, due to the necessity to properly handle and adjust many different modules and controls in order to replace a failed module. Another problem with the prior art amplifiers is that the proper selection of accessory circuit elements requires several calculations and analysis of the specifications of several components. Another problem with prior art amplifiers is that the manufacturer and distributor of such equipment must produce and inventory a large array of different coaxial cable equalizers to allow equipment to be used in systems with different bandsplitting requirements For instance, common bandsplits include the following:

|  | Inbound Frequencies | Outbound Frequencies |
| --- | --- | --- |
| Sub-Split | 5 to 30 | 50 to 450 |
| Mid-Split | 5 to 112 | 150 to 450 |
| High-Split | 5 to 186 | 220 to 450 |
| Dual Cable | 40 to 450 | 40 to 450 |

For each of these system types, a set of several outbound and several inbound cable equalizers must be maintained. For example, the Inbound High-Split system might require a set of five different cable equalizers, which might have attenuation characteristics which would compensate for the loss of five different lengths of coaxial cable corresponding to a loss of 4, 8, 12, 16, and 20 decibels at 450 MHz, but having attenuation characteristics which compensated only for the 5 to 186 MHz bandpass. These five Inbound High-Split Cable equalizers would not be usable in the Sub-Split, Mid-Split, or Dual Cable type systems, which would have their own specialized set of equalizers. To some extent the same problem exists with the outbound frequencies. Thus, the equipment manufacturer must produce and control inventory of twenty-five or more equalizer components in order to supply equipment for these type of systems.

Figure 5:
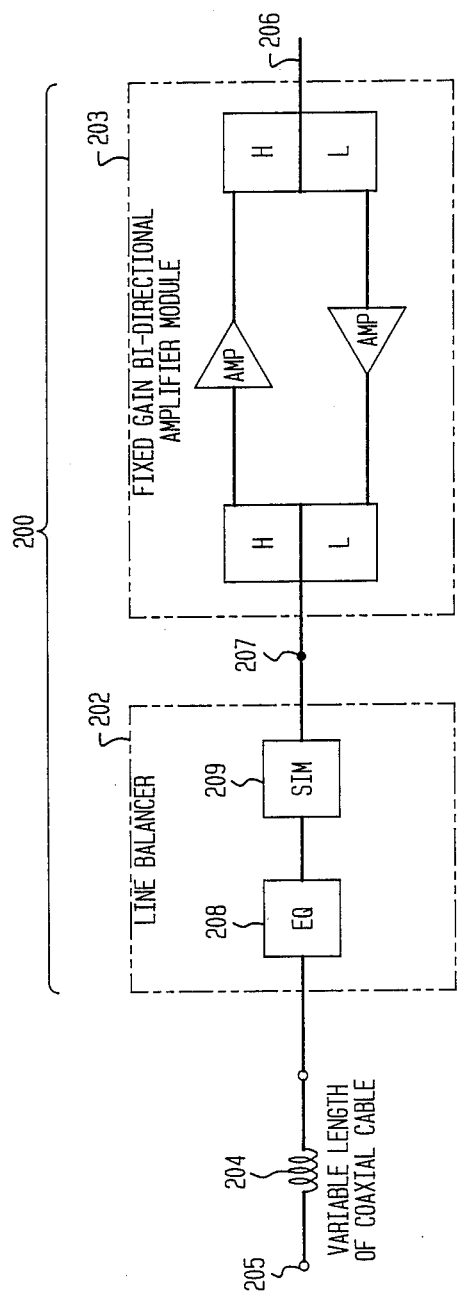
FIG. 5 schematically illustrates the "fixed-gain, fixed-loss" bidirectional broadband amplification system concept.

To overcome these problems, an inventive means of providing two-way broadband amplification for local area networks is shown in FIG. 5. The means for providing two-way broadband amplification is designated herein as the "fixed-gain, fixed-loss approach". The bidirectional amplifying unit 200 comprises two sections, the line balancer 202, and amplification module 203. The combined loss of the variable cable length 204 with the gain of the bidirectional amplifying unit 200 is illustratively designed to provide a unity gain simultaneously in both inbound and outbound directions. That is, outbound signals transmitted into the system at input 205 of the variable length of coaxial cable appear at the output 206 of the bidirectional amplifier 203 at the same signal strength while inbound signals transmitted into the system at output 206 of the bidirectional amplifier 203 appear at the input 205 of the variable length of coaxial cable 204 at the same signal strength. Further, the decibel gain of the bidirectional amplification module 203 when measured between input port 207 and output port 206 is equal in both outbound and inbound directions.

The line balancer 202 comprises two separate sections, a fixed cable equalizer 208 and a variable cable simulator 209. The variable cable simulator 209 is a continuously adjustable circuit which can simulate the decibel attenuation characteristics of a variable length of cable, illustratively shown to be 0 to 5 decibels at 450 MHz with cable attenuation characteristics simulated between the frequencies 5 to 450 MHz. The fixed cable equalizer is a fixed attenuation circuit which provides an attenuation characteristic which varies with frequency in a manner which, when combined with a specified length of coaxial cable, will provide a combined flat attenuation characteristic across a specified bandpass, in this case 5 to 450 MHz.

The fixed-gain, fixed-loss amplification system for broadband and local area network operates as follows: Illustratively, the gain when measured between port 207 and port 206 of the bidirectional amplifier 203 in FIG. 5 is a fixed value such as 25 decibels for both inbound and outbound signals. This represents the "fixed-gain" portion of the system. The "fixed-loss" portion of the system includes the combined attenuation of the length of coaxial cable 204 and the line balancer 202, the sum total of which should equal the fixed gain of the amplifier 203 (i.e. 25 decibels) for all frequencies between 5 and 450 MHz. Illustratively, the minimum attenuation of the line balancer is 5.0 dB at all frequencies between 5 and 450 MHz when the variable cable simulator circuit is adjusted to the minimum loss position. Thus, the maximum allowable decibel length of cable is 20 db at 450 MHz. Illustratively, the variable cable simulator is capable of simulating the loss characteristics of up to five decibels of coaxial cable at 450 MHz at all frequencies between 5 and 450 MHz. Thus, in order to provide for system designs with potential cable lengths of 0 to 20 dB at 450 MHz between amplifier locations, it is desirable to provide four different line balancers, shown as a list of equipment blow.

| Cable Attenuation dB at 450 MHz | Line Balance to be Used |
| --- | --- |
| 0 to 5 | LBE-5 |
| 5 to 10 | LBE-10 |
| 11 to 15 | LBE-15 |
| 15 to 20 | LBE-20 |

Figure 6A:
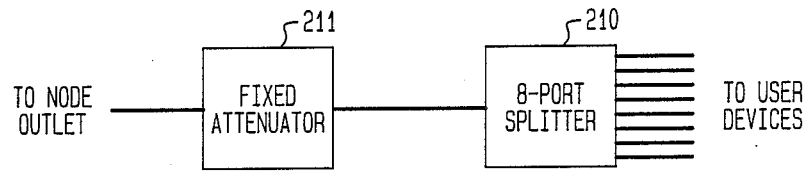
FIG. 6A, 6B and 6C schematically illustrate remote outlet clusters in accordance with the present invention.
Figure 6B:
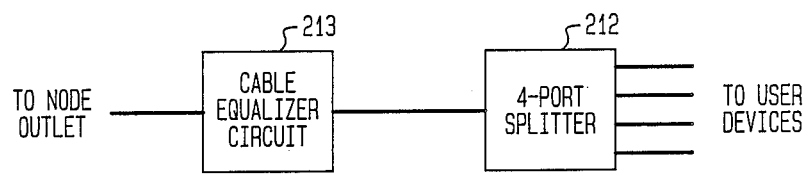
Figure 6C:
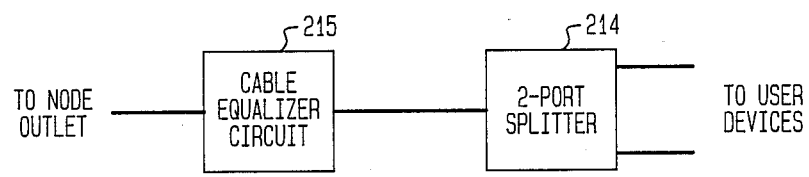

Each such line balancer includes a different equalizer 208 capable of providing a different amount of fixed attenuation. The operation of the line balancer 202 of FIG. 6 is now discussed in more detail. Illustratively, assume that the variable cable simulator circuit 209 has a flat attenuation characteristic of 3.0 db for all frequencies between 5 and 450 MHz when adjusted to the "zero dB cable simulation" position for any line balancer. For the LBE-5 listed above, then the attenuation characteristic of the cable equalizer circuit would be 17.0 dB at 450 MHz and attenuation characteristics at frequencies below 450 MHz are such that the combined attenuation of a 5 db length of coax at 450 MHz plus the cable equalizer circuit would be equal to 22.0 dB at any frequency between 5 and 450 MHz. Therefore, if a five dB cable length at 450 MHz is required by the system design and an LBE-5 is used with the adjustment of the variable cable simulator set to the "zero dB" position, the loss of the cable plus the loss of the LBE-5 is exactly 25 dB across the entire frequency range of 5 to 450 MHz. Now, assume that a system designer must use a 3 dB length of coaxial cable at 450 MHz between bidirectional amplifiers instead of the aforementioned 5 dB length of coaxial cable. By selecting the LBE-5 (selecting one component) and adjusting the variable simulator circuit control to simulate 2.0 dB of coaxial cable (adjusting one component) the loss of the signal path between cable input 205 of FIG. 5 and bidirectional amplifier port 207 has again been set to exactly 25 dB for all frequencies between 5 and 450 MHz, because the variable cable simulator adds attenuation to the circuit path in a manner identical to coaxial cable attenuation versus frequency characteristics. Thus, the task of providing a unity gain system for both outbound and inbound signal paths has been accomplished in both directions simultaneously by selecting a line balancer according to the above table. The following table illustrates the losses of the cable equalizers for the set of line balancers in this example.

| Cable Loss @ 450 MHz dB | Line Balancer | Cable EQ Loss @ 450 MHz db | Total LBE loss dB @ 450 MHz with variable simulator @ zero |
| --- | --- | --- | --- |
| 5 | LBE-5 | 17.0 | 20.00 |
| 10 | LBE-10 | 12.0 | 15.0 |
| 15 | LBE-15 | 7.0 | 10.0 |
| 20 | LBE-20 | 2.0 | 5.0 |

The inventive means of implementing two-way broadband amplification through utilizing the "fixed-gain, fixed-loss" technique for local area networks is simple and easy to design, install and maintain.

Simplicity of design is achieved because the system designer needs to have knowledge of only one parameter, e.g. the coaxial cable loss at 450 MHz. Then, for a given system, this one calculation can be used to select the proper line balancer. The reason for this is that cable losses are maximal at the highest frequency, i.e. 450 MHz. Thus, if sufficient amplification is provided to compensate losses at this frequency, then the system will perform satisfactorily throughout the desired frequency range.

Simplicity of installation results due to the need to install only one line balancer per bidirectional amplifier and adjust only one component, the variable simulator circuit.

Simplicity in maintenance is due to the separation of the line balancer from the bidirectional amplifier. The line balancer circuit is generally a passive circuit and has a much greater reliability than the bidirectional amplifier, which consumes power, is more complex, and has active semiconductor devices which are more prone to failure than the passive circuits used to implement the line balancer. Thus, the most probable fault in a station is the failure of the bidirectional amplifier, which, for the purposes of this inventive method, is a module separate from the line balancer. Thus, replacement of failed bidirectional amplifiers does not require readjustment of the line balancer. This compares to adjustment of components required in replacement of the variable gain amplifiers used to implement prior art systems.

Furthermore, the line balancer described in this inventive approach can be used with any type of broadband system, regardless of the split of the bands. That is, the inherent nature of the line balancer concept is to provide an accurate and complete adjustment across the entire frequency band of interest. The split of the bandpass is then only a function of the type of bidirectional amplifier used, thereby dramatically reducing the number of line balancers needed by the equipment manufacturer in order to provide a line of equipment used in sub-split, midsplit, high-split or dual cable systems. The same line balancer would be used whether the system was sub-split, mid-split, highsplit or dual cable. This simplifies the manufacture, inventory and distribution of the product line for the equipment supplier.

4. Star-Feeder Concept for User Connections

The conventional local area network of FIG. 1 utilizes the common tree-and-branch "tapped feeder" approach for providing a plurality of user connection outlets so that user devices can be connected to the network via drop connections. As was previously disclosed, although system performance specifications typically allow design path loss variations to be plus or minus 3 dB in both outbound and inbound signal paths, the conventional network "tapped feeder" concept requires that at least plus or minus 2 dB of this allowable path loss variation be consumed by variations inherent in the basic limitations of the "tapped feeder" approach to system design. Thus, typical drop lengths are either limited in length or indeed specified to be of fixed length, typically 50 feet of RG-6 type coaxial cable.

A purpose of the invention network 100 of FIG. 3 is to provide for ease of design, installation and use of a broadband LAN. Instead of providing a serially connected succession of short cable lengths and tap units that provide user connection ports, and instead of requiring four different calculations of path loss to determine if the network will meet specified parameters, which causes difficulty in design, the inventive network is based upon a design principle which requires that only knowledge of the path loss at the highest frequency needs to be determined. This, in turn, directly translates into a knowledge of a maximum length of cable, given a cable type. In turn, the system design parameters for the user connections can then be limited to a trivial calculation of distance from a particular user device location to the user connection port.

The "Star-Feeder" concept disclosed here is based upon a design concept which allows the only variable in system design to be the length of coaxial cable being used. Assuming that other components in the broadband network are properly designed, if the path loss variations inherent in the design of the network are due only to coaxial cable variations, then the maximum variation in path loss which will be experienced by any signal on the system will be at the highest design frequency of the system. It follows that, given the above assumptions and conditions, that if the path loss is within specification at the highest frequency, then path loss variations at any lower frequency will be smaller in magnitude and do not have to be calculated.

The "star-feeder" concept disclosed here is based upon two different types of user connection devices. The first is a direct user drop panel connection device located in the node (118 of FIG. 3), and a second is a device capable of providing a plurality of user connection outlets at a location remote from the note (120 of FIG. 3). This latter device has been designated herein the "Remote Outlet Cluster".

For the case of the direct user drop panel located at the node, an attempt is made to take full advantage of the allowable variation in path loss design value to provide as long a drop connection cable as possible. For the case of the IEEE 802.7 or MAP system specifications, for instance, this would indicate that the design value for the outbound path loss at 450 MHz be specified as 3 dB below the nominal system design value for signals transmitted from the hub to the user device receiver, while the design value for the inbound path loss might also be 3 dB below the nominal system design value for signals transmitted by the user devices. Therefore, a direct connection with a nominally short length of cable would result in system performance requirements for path loss being achieved. The other limit of cable length is where the loss of coaxial cable used for the drop connection is at the maximum permissible value for the particular system path loss specification. For example, the IEEE 802.7 or MAP system specifications permit the path loss to be a maximum of 3 dB above nominal values. In this case, the allowable cable drop connection might be 6 dB at 450 MHz. That is, the drop panel path loss added to the 6 dB loss of the coaxial drop connection would result in a path loss 3 dB above nominal for outbound signals at 450 MHz. However, since the cable loss is less than 6 dB for all frequencies below 450 MHz, the path loss must then be within required specifications.

In the LAN of the present invention, a direct drop panel (e.g. the 118 of FIG. 2) located at a node is capable of providing a maximal variation in the allowable drop connection cable length. Thus, for example, a node might have a direct drop panel which comprises a conventional 16-port splitter within a system which provides for the path loss at the highest frequency of the system to be 3 dB below nominal allowable path loss and at which the path loss at the lowest frequency of the system is 3 dB below nominal allowable path loss. In this manner, for example, sixteen user devices in a MAP or IEEE 802.7 system can be serviced using RG-6 type cable within a radius of 120 feet of a node location. This compares with the 50 foot service radius of conventional local area networks.

However, a system which relies totally upon the use of direct drop connections from a node which also contains a bidirectional amplifier would require the LAN utilization of a large number of nodes, which would result in a LAN design that would be more costly than the conventional LAN. It is desirable in the inventive network to have a means for providing a plurality of user connections at locations remote from the node locations However, it is also desirable to maintain the simplicity of design inherent in the inventive LAN.

Therefore, the network of FIG. 3 indicates the use of remote outlet cluster devices 120 which are intended to provide a plurality of user connection outlets at a location remote from the node. Use of such remote outlet clusters provide significant advantages. Configuring a system which uses only the loss of the coaxial cable as a path loss variable results in an easy to design system. Further, such devices can be deployed in a manner which does not depend upon other such devices, such as in a star configuration. Thus, the remote outlet cluster devices enable a LAN which is easy to design, install, maintain, expand and rearrange.

In order to accomplish the results stated above, the inventive network utilizes remotely located devices which are identified as remote outlet clusters 120 in FIG. 3. Since a user connection at a remote outlet cluster comprises two separate lengths of coaxial cable, one to connect the remote outlet cluster to the node and another, the "drop connection" to connect the user device to he Remote Outlet Cluster, the inventive system shares the allowable variation in cable loss equally between these two cable sections. Illustratively, the connection between the node and the user outlet splitter is allowed to vary 3 dB and the drop connection is allowed to vary 3 dB. In this manner, up to 75 feet of direct drop coaxial cable is allowed from a remote outlet cluster to a user device.

In order to optimize the number of user outlets and also provide for considerable flexibility in their deployment, a plurality of different remote outlet clusters may be utilized.

The first is an 8-port Remote Outlet Cluster (see FIG. 6A) which comprises a conventional 8-port splitter circuit 210 and a 1 dB fixed attenuator 211. The conventional 8-port splitter ideally has an attenuation of approximately 9 dB, therefore, the 8-port user outlet splitter will have 10 dB of path loss for both inbound and outbound signal paths. In addition, this 8-port user outlet splitter would be allowed to be connected to a signal path with an allowable variation in coaxial cable loss of 6 dB at 4500 MHz. Thus, a node might comprise a plurality of outlets capable of driving remote outlet clusters, said node outlets having a path loss of 13 dB below the nominal specified path loss of the system in both inbound and outbound signal paths. Therefore, the location of the 8-port user outlet splitter might vary from 0 to 3 dB of coaxial cable from the node and have a drop connection which might vary from 0 to 3 dB. The path loss of a user device connected to the system would then be a minimum of 3 dB below nominal for the case of a very short length of cable being used for both the connection of the remote outlet cluster to the node and also for the user device to the remote outlet cluster, while the maximum path loss would be 3 dB above nominal for the case of both cable lengths being at the maximum 3 dB permissible value at 450 MHz. Both inbound and outbound path losses for all other frequencies below 450 MHz would then be less than the required maximum values.

The second device is a 4-port remote outlet cluster (see FIG. 6B) which comprises a conventional 4-port splitter 212 and a circuit which equalizes coaxial cable 213. The conventional 4-port splitter ideally has an attenuation of approximately 6 dB, while the coaxial cable equalizer circuit nominally has an attenuation of 1 dB at 450 MHz. Since it would be desirable for all remote outlet clusters to be connected to similar outlets at the node, and since in the paragraph above the node has been defined as comprising a plurality of outlets having a path loss of 13 dB below the nominal specified path loss of the system in both inbound and outbound signal paths for driving remote outlet clusters, and since it would be desirable for the allowable drop connections from all remote outlet clusters in the system to have similar specifications, it follows that the application of the 4-port remote outlet cluster is for locations which are a minimum of 3 dB of coaxial cable loss from the node and for a maximum of 6 dB of coaxial cable loss from the node. It also follows that the attenuation characteristics of the coaxial cable equalizer in the 4-port remote outlet cluster should be such that when the loss of 3 dB of coaxial cable at 450 MHz is added to the loss of the cable equalizer, that the resultant combined losses of both should be 4 dB at all frequencies from 5 to 450 MHz.

The third device is a 2-port remote outlet cluster (see FIG. 6C) which comprises a conventional 2-port splitter 214 and a circuit 215 which equalizes coaxial cable. The conventional 2-port splitter ideally has an attenuation of approximately 3 dB, while the coaxial cable equalizer circuit nominally has an attenuation of 1 dB at 450 MHz. Since it would be desirable for all remote outlet clusters to be connected to similar outlets at the node, and since in the paragraph above the node has been defined as comprising a plurality of outlets having a path loss 13 dB below the nominal specified path loss of the system in both inbound and outbound signal paths for driving remote outlet clusters, and since it would be desirable for the allowable drop connections from all remote outlet clusters in the system to have similar specifications, it follows that the application of the 2-port remote outlet cluster is for locations which are a minimum of 6 dB of coaxial cable loss from the node and for a maximum of 9 dB of coaxial cable loss from the node. It also follows that the attenuation characteristics of the coaxial cable equalizer in the 2-port remote outlet cluster should be such that when the loss of 6 dB of coaxial cable at 450 MHz is added to the loss of the cable equalizer, that the resultant combined losses of both should be 7 dB at all frequencies from 5 to 450 MHz.

In summation, a "star feeder" system has been defined which provides for direct drop connections from a node in the broadband star network and which also provides for a plurality of remotely located outlet clusters connected to the node. The inventive system design concept of the "star feeder" and components defined to implement the system provides a means which allows a very simple system design, depending only upon a trivial calculation of distance between devices in the system, which allows ease of installation. Illustratively, only three "taplike" devices are required to implement the system and only areas which have known users might be initially installed. The system provides for growth, by providing a node which is capable of a plurality of direct user connections and a plurality of user outlet splitters to be connected.

5. Description of the Network Nodes

Figure 7:
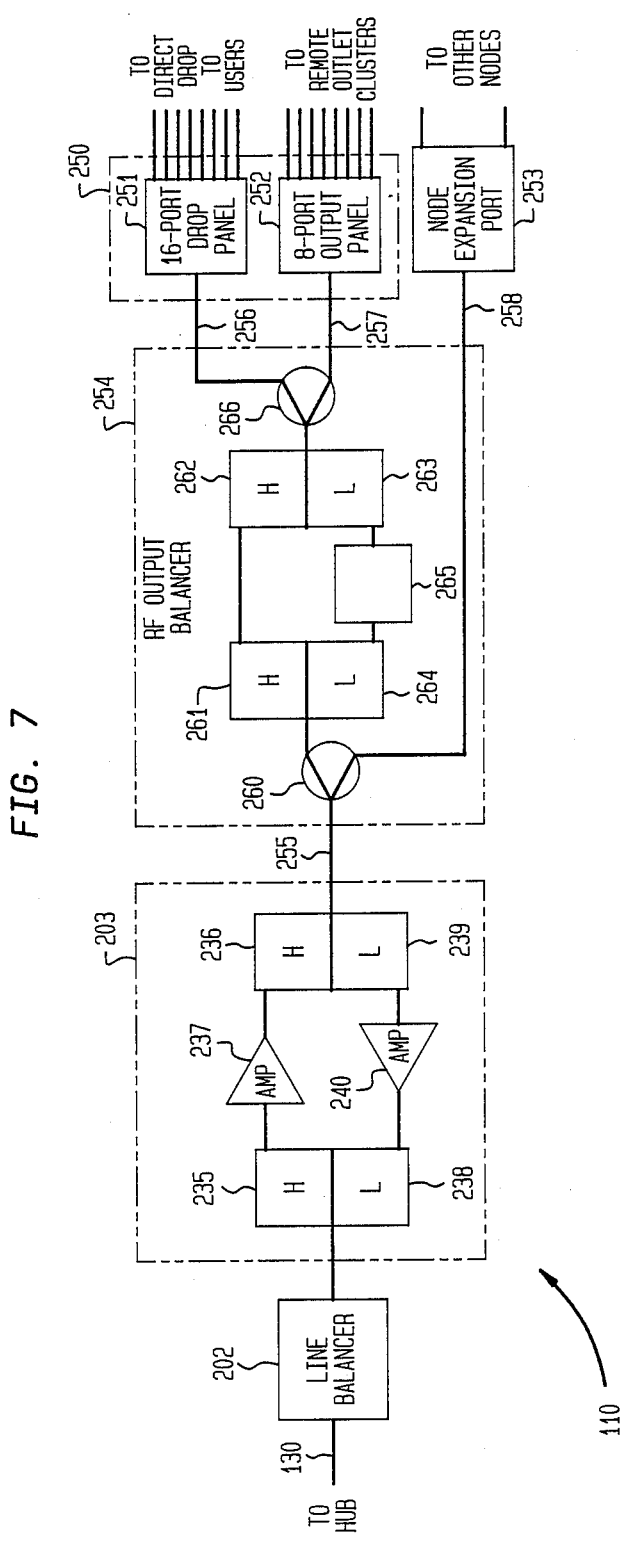
FIG. 7 schematically illustrates a node suitable for use in the network of FIG. 2.

One of the nodes 110 of FIG. 3 is shown in greater detail in FIG. 7. Illustratively, the nodes 10 of FIG. 3 is connected directly to the hub 102 via lines 130. The node 110 includes a line balancer 202 (see FIG. 5) which can balance a variable amount of cable loss depending upon how far the node is located from the hub (or from another node) and a "fixed-gain" bidirectional amplifier module 203 (see FIG. 5) which is used to implement the "fixed-gain, fixed-loss" approach to the broadband system design.

Since the network of FIG. 3 is bidirectional, the bandwidth of the network is divided into two bands. One band is used for outbound (i.e. away from the hub) transmission and the other band is used for inbound (i.e. towards the hub) transmission. Thus, within the bidirectional amplifier 203, the outbound transmission path includes the high-pass filters 235, 236 and amplifier 237. The inbound transmission path includes low pass filters 238, 239 and amplifier 240.

The node also contains a user output array area 250 which can accept two types of panels intended to implement th "starfeeder" concept. One of each type is shown illustratively as a 16-port drop panel 251 (which is a conventional 16-way splitter plus a fixed attenuator) and an 8-port output panel 252 (which is a conventional 8-way splitter) for providing connections to remote outlet clusters (see FIG. 6). For example, a node might have two 16-port drop panels 251 installed in the user output array area 250, used exclusively to connect direct drop cables to user devices, providing up to 32 direct connections, or a node might have two 8-port drop panels 251 installed in the user output area 250, used exclusively to connect to remote outlet clusters or a combination of one of each type of panel.

The node also contains a node expansion port 253 which is a conventional 2-port splitter that is used to connect other nodes to the system by expanding upon the node already installed.

Figure 8:
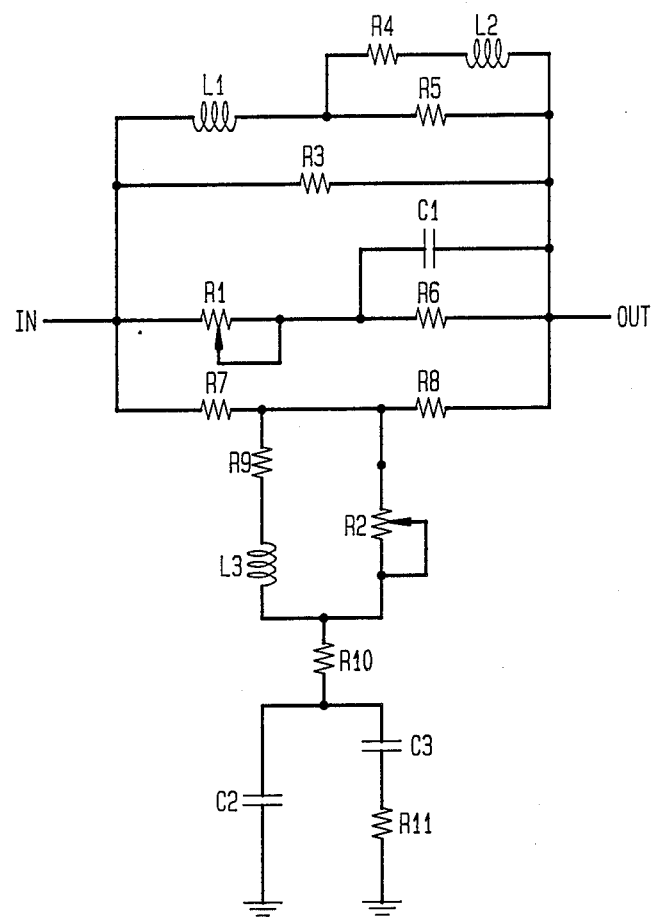
FIG. 8 schematically illustrates a variable cable simulator used in the line balancer.

FIG. 5 shows the line balancer 202 in greater detail. As discussed above, the line balancer 202 enables a node to be located a variable distance from the hub or another node. The line balancer 202 comprises fixed cable loss equalizer 208 and variable cable simulator 209. The variable cable simulator simulates the load of an adjustable amount of cable. This adjustment is performed by adjusting the position of a single control on a circuit element which comprises a dual-ganged potentiometer. The loss of the fixed cable equalizer provides a predetermined loss which enables the combined loss of a selected amount of cable plus the loss of the cable equalizer to equal a fixed amount of flat attenuation across the entire frequency band of interest of the system. The sum total of the loss of the cable between hub and node plus the loss of the line balancer will be equivalent to a flat attenuation across the frequency and of interest. The cable simulator, which illustratively comprises a bridge T variable attenuator is shown in more detail in FIG. 8.

The variable cable simulator is a variable bridge-tee circuit shown in FIG. 5. R7 and R8 are the tee resistors and are 75 ohms. R1 and R2 form a ganged variable resistor pair that combined provide proper resistance so that the input and output driving point impedances are 75 ohms at any setting of the ganged resistor pair. C1 and R6 in conjunction with R9 and L3 limit the range of potentionmeter R3 and R10 in conjunction also limit the range of the potentiometer. R5, L1, C2 and R11 provides proper high frequency (above 150 MHz) responses for the simulator R4, L2 and C3 provide proper operation at lower frequencies (5 to 150 MHz).

In order for the node to be attached to other nodes in the system, a node expansion port 253 of FIG. 7 is provided. In order for the fixed-gain, fixed-loss approach to be implemented, it is necessary for a unity gain to be established in the signal path between the output 255 of the amplification module 203 of the node 110 of FIG. 7 and the corresponding point in the adjacent node attached by way of the node expansion port 253. Since it is desirable to provide only one bidirectional amplifier in the node to provide amplification of signals for connection to both the user connection portion of the system and also to feed other nodes in the system, most of the power being delivered by the amplification module 203 in the outbound direction, for instance, is being supplied to the user connections via the directional coupler 260 which forms part of the RF balancer 254 of FIG. 7. Thus, the path loss for implementing the fixed-gain, fixed-loss concept in the node system is determined by the allowable path loss between node-to-node connections via the signal path from RF output balancer input 255 to the output of node expansion port 253 to the input of the line balancer 232 of the next node. Thus, the gain specification of the amplification module 203 is equal to the sum of the loss of the line balancer plus the loss of the path from output 255 to node expansion port 153 plus the allowable spacing between nodes. This gain relationship determines the unity gain relationship in the fixed-gain, fixed-loss system for node-to-node connections. In order to implement the system it is necessary to provide line balancers which will produce a fixed, flat attenuation in this signal path for all frequencies.

For example, if the path loss for the node connection path including directional coupler 260 and node expansion port 253 is 12 dB and the line balancer loss is 5 dB at the zero adjust position and the spacing between the node-to-node connections is 10 dB, then the gain of amplification module 203 must be equal to the sum of these losses, or 27 dB.

The hub to node connection has a different relationship which determines the gain of the bidirectional amplifier in the hub, as well as determines the specification for the line balancer used in nodes connected to the hub. In order to implement the fixed-gain, fixed-loss concept at the hub, it is necessary to provide a flat attenuation characteristic (not necessarily restricted to the unity gain required for the node-to-node path or equal to the node-to-node path loss) between the output array 286 of the hub shown in FIG. 9 and a directly connected node. For example, it might be desirable to have 20 dB hub-to-node spacing. Assuming a line balancer minimum loss of 5 dB, this in turn requires that the path loss between the hub output array 286 of FIG. 9 and output of the line balancer in the attached node be 25 dB flat attenuation across the band of interest and also that the operational outbound RF signal levels at the output array of the hub be at levels 10 dB above those at the output of the node expansion port 153, as well as requiring that the operational inbound RF signal levels at the output array of the hub be at RF signal levels which are 10 dB below those of the node expansion port 153.

Thus, the implementation of the fixed-gain, fixed-loss approach to bidirectional amplification in the broadband network establishes firm and fixed relationships between the specifications of all of the devices required to perform the implementation in a manner not found in conventional prior art systems. Implementation of a specific set of required network parameters, such as IEEE 802.7 or MAP requires that proper gain and operational signal levels are established simultaneously in an integrated manner for all devices used in the network.

The node also contains an RF output balancer 254 which provides for not only splitting and recombining of RF signals for both inbound and outbound transmission paths, but also contains circuitry to balance the requirements of the network regarding standard path loss for the user connections implemented with the "star-feeder" section of the system with the system requirements for implementing the "fixed-gain, fixed-loss" system design approach.

Before describing the RF output balancer in more detail, the problem regarding the need for the RF output balancer will be briefly explained. The inventive network being described utilizes the fixed-gain, fixed-loss system concept in order to simplify design of the equivalent of the "trunk" section of a conventional network. The inventive network being described also is accomplishing the task of providing a simple and easy implementation of user connections to the system via the "star-feeder" concept and implementation. The inventive network requires that this user connection portion of the system provide specific path loss specifications at the direct drop panel 251 and the 8-port 252 output array depending upon the specifications of the type of broadband network to be implemented. In the inventive network, it is necessary to add a new circuit, the RF output balancer 254 to simultaneously be able to provide an optimized "fixed-gain, fixed-loss" amplification system and connect the amplification section of the system to the simple and easy to install "star-feeder" user outlet portion of the system which is also optimized for performance.

The RF output balancer circuit 254 of FIG. 7 includes an input port 255, two user output array ports 256, and 257 and a node expansion port output 258. A conventional directional coupler 260 is connected to input port 255 which provides a lower path loss to the user connection portion of the system and provides the rest of the power to output 258 which is used to provide a path for signals to be connected to other nodes in the system. Thus, the outputs of directional coupler 260 are connected to node expansion port 253 and to the input of a diplex filter, comprising high pass filter 261 and low pass filter 264. The outbound transmission path from the input of the diplex filter comprises the high pass filters 261 and 262 and the conventional splitter 266. The outputs of splitter 266 are connected to user output array ports 256 and 257. The inbound transmission path from user output port 256 (and 257) includes the splitter 266, low pass filters 263 and 264, and attenuator 265. In this manner, the inbound transmission path for the signals originating at the user connections are attenuated to provide for proper balancing of inbound signal levels generated by users located at nodes connected to the node expansion port 253. The value of attenuator 265 is predetermined and not user selectable.

The 16-port drop panel 251, in conjunction with the RF output balancer, is provided for direct drop connections to user devices from the node as described in the "star-feeder" concept. In this implementation the 16-port drop panel comprises a fixed attenuator and a conventional 16-port splitter. This allows either an 8-port output panel or a 16-port drop panel to be located in a node by connecting to the RF output balancer.

It is the node structure which gives the network 100 of FIG. 2 its great simplicity and flexibility. First, because of the use of the fixed-gain bidirectional amplifier, which requires no adjustments and can be replaced in the system without requiring that any adjustments be performed. In addition, the use of the line balancer concept, which simultaneously provides for balancing of the path loss between amplifiers in the system in both inbound and outbound directions with a single variable adjustment. In addition, the network may be expanded from a relatively small size by adding additional nodes or additional user outlet splitters to already existing nodes without affecting the path loss at existing user connections. In addition, the network is capable of implementing both the simplified bidirectional amplification system of the fixed-gain, fixed loss concept while simultaneously providing a "star-feeder" user connection system through use of the RF output balancer, which is predetermined and not required to be adjusted by the system operator. In addition, the network is capable of providing a longer drop length from the 16-port drop panel than from conventional prior art networks.

6. Description of the Network Hub

Figure 9:
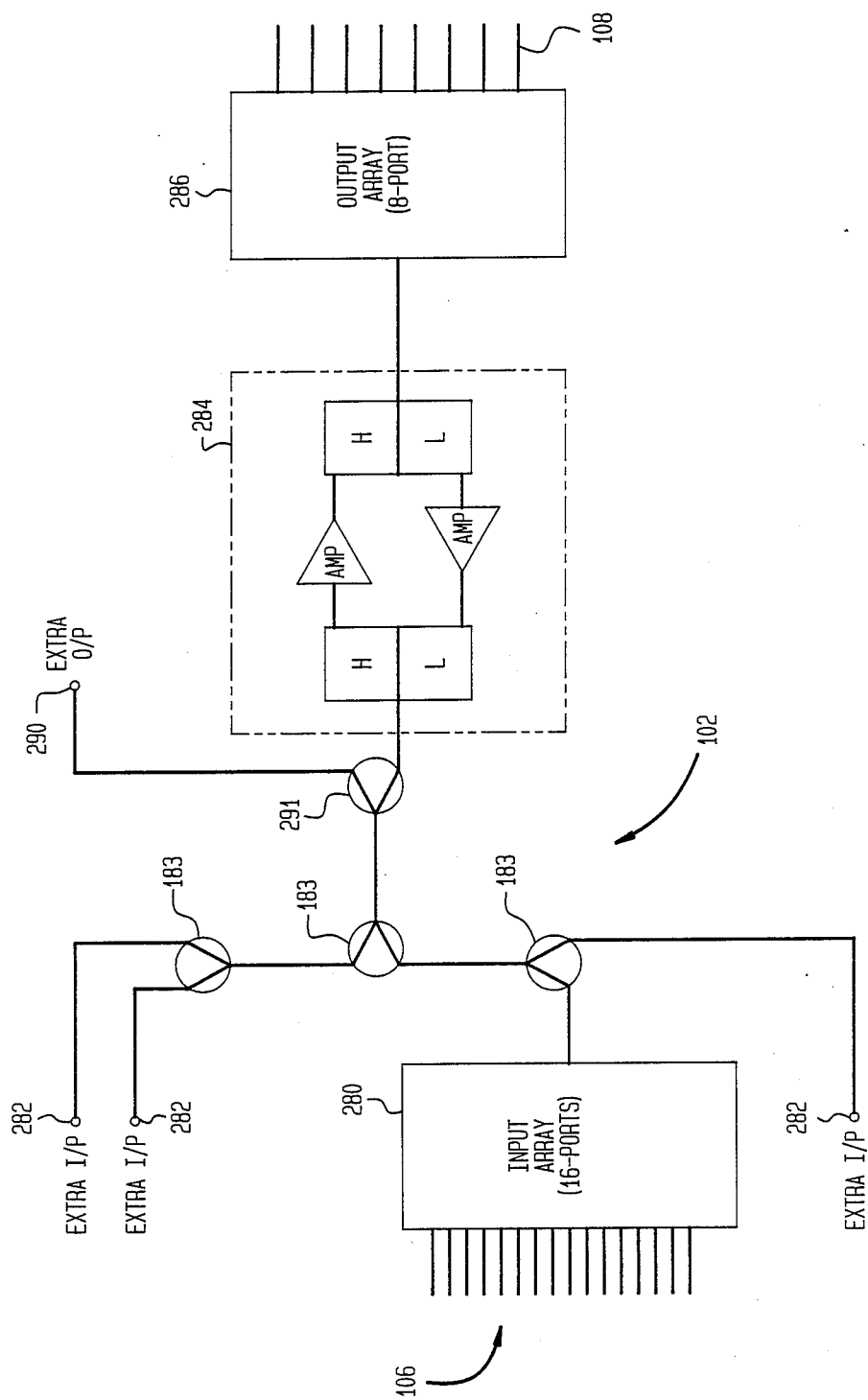
FIG. 9 schematically illustrates a hub for use in the network of FIG. 2.

The network hub 102 of FIG. 3 is shown in greater detail in FIG. 9. Illustratively, the hub includes an output array 286 comprising a conventional 8-port splitter having the outputs 108. Each output 108 of the output array 286 might be connected to a node via coaxial cable. The hub also illustratively includes an input array 280 comprising a conventional 16-port splitter. The inputs to the input array are designated 106 in FIGS. 3 and 9. As was previously discussed, the input array is intended to provide a means for connecting user devices at the "headed" of the broadband transmission medium with the system connection specifications for the medium intended to meet required standards such as IEEE 802.7 and MAP. The number of hub user connections can be expanded from the original 16 user connections 106 to 64 user connections via lines 282, which are provided for attachment of three additional 16-port input arrays similar to input array 280. This is accomplished by providing the combination circuits comprising of conventional 2-port splitters 283.

The hub also includes a hub driver module 284, which is a fixed-gain bidirectional amplifier intended to perform the amplification function needed at the hub to implement the fixed-gain, fixed-loss approach to system design. The fixed-gain bidirectional amplifier 284 located at the hub differs from the fixed-gain amplifiers 203 of FIGS. 5 and 7 located at the nodes in that the node fixed-gain amplifiers must have equal gain in both inbound and outbound transmission directions in order to allow for the connection of other identical nodes to the system via the node expansion ports 253 of FIG. 5. In order to implement the fixed-gain, fixed-loss concept at the hub it is necessary that the gains of the outbound and inbound signal paths provided by the hub driver modular be selected independently to simultaneously provide the correct and proper user connection transmit and receive levels at the input array 280 while providing correct and proper transmit and receive levels at the output array 286.

In this manner, that is by predetermining the exact amount of RF gain required by both inbound and outbound signal paths for the hub, which connects a plurality of user connection devices and provides for the amplification and distribution of these signals in a manner which exactly provides the proper levels for implementation of the fixed-gain, fixed-loss approach to broadband system design, it is possible to provide a hub for use in the inventive network which requires no adjustments by the user. This facilitates design, installation and use of the network.

The number of direct connections to nodes may be increased from eight to sixteen via line 290, which is derived from a conventional splitter 291. The method for adding extra outputs to the hub is to add an additional hub driver module and output array connected to line 290.

7. Conclusion

An easy to install and easy to expand broadband local area network having a star-type architecture based upon a "fixed-gain, fixed-loss" approach to bidirectional broadband amplifications system and a "star-feeder" approach to providing user connections throughout the system has been disclosed. The embodiments of the invention include a hub, node, line balancer, user outlet splitters and the integration of the required parameters of these elements into a system. Finally, the above-described embodiments of the invention are intended to be illustrative only. Numerous alternative embodiments may be devised by those skilled in the art without departing from the spirit and scope of the following claims.

I claim:

1. A device for balancing losses in a coaxial transmission path of a bidirectional network having an inbound and an outbound frequency band comprising
    a line balancer circuit including an equalizer circuit for equalizing the loss of a fixed amount of coaxial cable, and simulator circuit means for providing a variable amount of loss for simulating a variable amount of coaxial cable, and
    a bidirectional amplifier having a fixed gain across said inbound and outbound frequency bands and connected to said line balancer circuit,
    said simulator circuit means being adjustable so that the sum of the losses provided by the coaxial transmission path, the equalizer circuit and the simulator circuit means are equal in magnitude to the fixed gain of the bidirectional amplifier across the inbound and outbound frequency bands of the network.

2. The device of claim 1 wherein said simulator circuit means comprises a bridge T variable attenuator.

3. The device of claim 1 wherein said transmission path further includes a directional coupler and an expansion port circuit.

4. The device of claim 1 wherein said fixed gain bidirectional amplifier comprises an outbound path including a first pair of bandbass filters corresponding to said outbound frequency band separated by a first flat gain versus frequency amplifying element and a second pair of bandbass filters corresponding to said inbound frequency band separated by a second flat gain versus frequency amplifying element.

5. A device for balancing losses in a coaxial transmission path of a network capable of transmitting signals in an inbound and outbound direction in an inbound and outbound frequency bandwidth, respectively, said device comprising:
    a coaxial cable equalizer circuit, and
    a cable simulator circuit in electrical communication with said equalizer circuit for simulating the loss of a variable amount of coaxial cable,
    said cable simulator circuit being adjustable so that the combined loss of the transmission path, the cable simulator circuit and the cable equalizer circuit equals a predetermined fixed loss across the entire inbound and outbound bandwidth of the network.

6. The device of claim 5 wherein said device further comprises a bidirectional amplifier connected to said simulator circuit and having a fixed gain across said inbound and outbound bandwidth, said predetermined fixed loss being equal in magnitude to the fixed gain of the bidirectional amplifier.

7. The device of claim 5 wherein said coaxial transmission path includes a directional coupler and an expansion port circuit.

* * * * *